Figure 1:
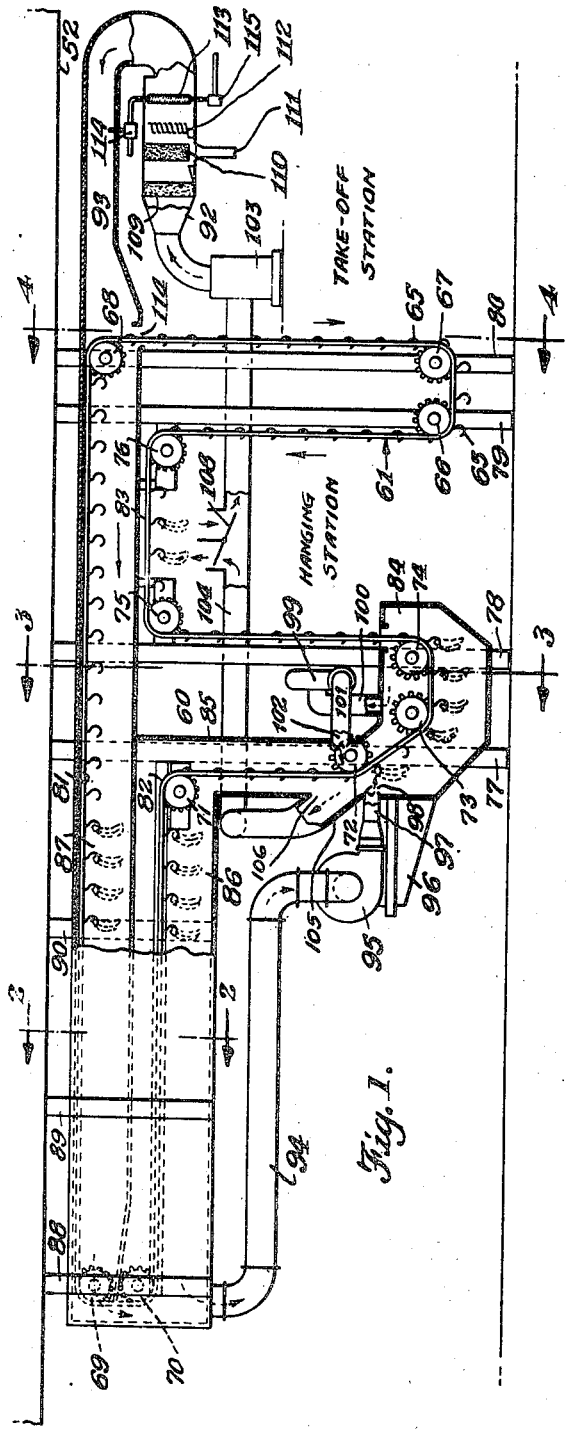

Oct. 14, 1947.   R. O. HOCKMAN ET AL   2,429,130
APPARATUS FOR COATING BANANAS
Filed Nov. 29, 1943   2 Sheets-Sheet 1

Inventor
Robert O. Hockman
Walter C. Reiman
By A. Yates Dowell
Attorney

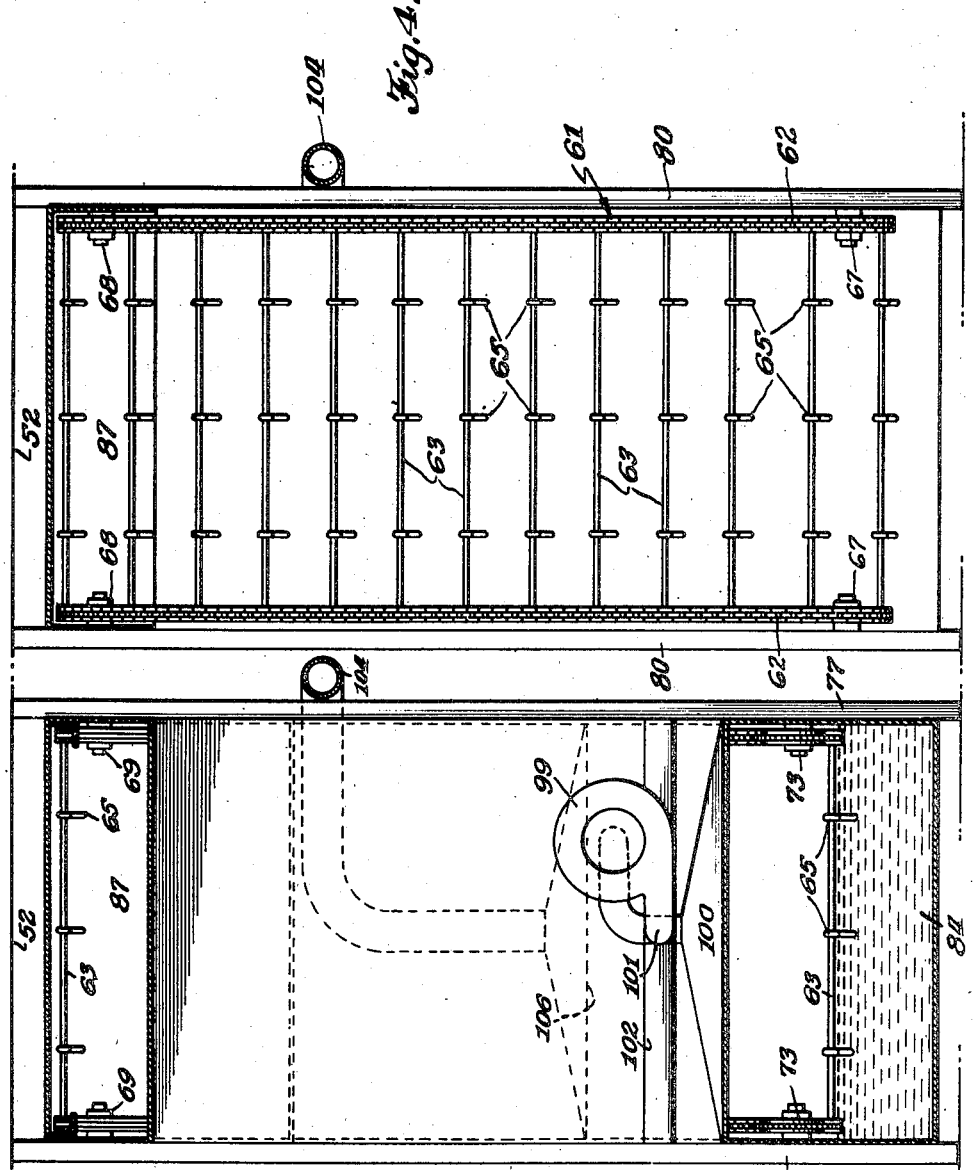

Patented Oct. 14, 1947

2,429,130

UNITED STATES PATENT OFFICE 2,429,130

APPARATUS FOR COATING BANANAS

Robert O. Hockman and Walter C. Reiman, Cincinnati, Ohio, assignors to The Kroger Grocery & Baking Company, Hamilton County, Ohio Application November 29, 1943, Serial No. 512,232

18 Claims. (Cl. 91—55)

This invention relates to the application of wax coatings upon fruits and is directed particularly to an apparatus which is adapted to be used for this purpose. The invention is applicable to the coating of fruits of various types, but is disclosed particularly in relation to the waxing of bananas.

The present application is a continuation in part of our copending application, Serial No. 426,088, which was filed January 8, 1942.

The waxing of fruit in general, and bananas in particular, has been found to increase the saleable life of the fruit while it is on display in retail stores and also to preserve the quality and edibility of the fruit while it is in the consumers possession. These results are obtained primarily because wax coatings decrease the rate of respiration of the fruit and reduce weight loss after ripening and before use. The treatment is valuable also because it preserves the natural appearance of the fruit over a long period of time. This is particularly advantageous in respect to bananas since they are maintained in a clean condition, and since the weakening of the necks of the bananas is retarded; if the necks become too weak the bananas drop from the crown of the hand and the individual pieces of fruit then either must be discarded or sold at a reduced price.

Wax coatings of various types may be applied conveniently and quickly by the apparatus of this invention. Preferably, coatings of the wax emulsion type are utilized because of improved results which such compositions are able to provide. The coating compositions are applied in liquid form, for example, as emulsions of wax in water, and one of the principal purposes of the equipment of the present invention has been to deposit such coatings upon the fruit and then remove the water, or dry or harden the coating, such that a water-resistant film will remain upon the surface of the fruit, present a natural appearance and surface texture or "feel of the fruit," and reduce the respiration of the fruit. The invention contemplates an apparatus with which such waxing operations may be conducted automatically and efficiently with a minimum of manual handling and labor.

In applying the coating, the bananas are preferably cut from the stalk in small bunches or units known in the trade as "hands," hung on the initial stretch of the conveyor, dipped in the emulsion and permitted to drain for a short period, after which the excess wax is removed by an air stream and the coating allowed to dry.

The bananas are ripened at temperatures from 60 to 72 degrees F. and are brought directly from the ripening room for processing. During conditions of relatively high humidity and temperature, bananas are sometimes brought from the rooms at temperatures below the dew-point of the air, resulting in sweating or condensation of moisture on the bananas. Therefore, the temperature in the entrance should be such as to be slightly above the dew point of the bananas. Obviously, climatic and weather conditions are factors which influence the condition of the bananas undergoing processing.

Figure 2:
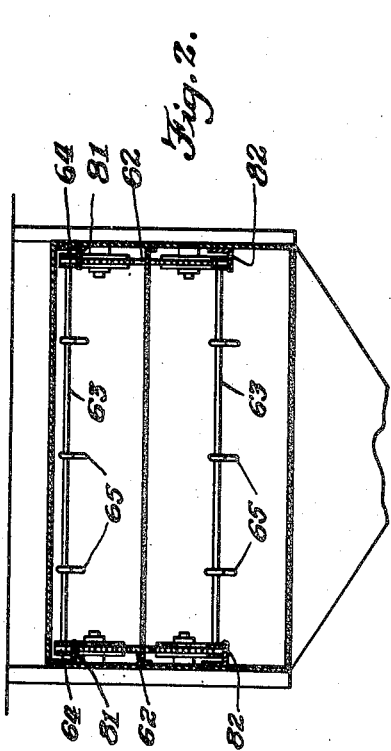

The coating operation may be performed automatically by the apparatus illustrated in the accompanying drawings. wherein:

Figure 1 is a side elevation partly broken away, with some of the parts diametrically shown, of banana waxing apparatus in accordance with the present invention;

Fig. 2, a section on the line 2—2 of Fig. 1;

Fig. 3, a section on the line 3—3 of Fig. 1; and

Fig. 4, a section on the line 4—4 of Fig. 1.

Referring to the drawings, the apparatus includes a main treating and drying chamber 60, having a main conveyor 61. The conveyor 61 is formed of parallel side chains 62, connected by cross rods 63, pivoted at their opposite ends in the side chains and provided with trunnions 64. Spaced hooks 65 are secured to the rods 63 for supporting "hands" of bananas suspended therefrom.

The conveyor chains are trained over a series of sprockets 66 to 76, inclusive. These sprockets are supported by a frame structure including vertical posts 77, 78, 79 and 80. The upper horizontal portion of the conveyor is supported on angular track member 81 while the lower horizontal portion is supported by tracks 82 and 83.

The conveyor thus far described may be driven in any suitable manner as, for example, by an electric motor, not shown, having a driving connection through suitable reduction gearing with any one or more of the shafts mounting the chain sprockets 66 to 76, inclusive.

The treating and drying chamber 60 is preferably air conditioned and in the form shown is partitioned off into a series of separate chambers including a dipping and coating chamber 84, a vertical drying chamber 85, a horizontal drying chamber or tunnel 86, and a final drying tunnel or chamber 87.

The entire apparatus may be supported from the ceiling 52, as shown by the uprights 77 to 80, inclusive, and the additional uprights 88, 89 and 90 connected to the drying tunnels 86 and 87. The suspension of the apparatus from the ceiling increases the floor space available which is of great importance in installations where floor space is limited.

For conditioning the air for drying the bananas after they have been dipped in the wax emulsion bath in chamber 84, an air conditioning unit 92 is employed and is connected by a duct or conduit 93 with the forward end of the uppermost drying tunnel 87 into which air is discharged from the conditioner. A conduit 94 is connected to the opposite end of the drying tunnel 87 into which the bananas pass from the contiguous discharge end of the drying tunnel 86. This conduit is connected to a blower or air pump 95 mounted upon a platform 96 at the side of the dipping chamber 84. The blower 95 is provided with a nozzle 97 for directing a blast of air through an opening 98 against the bananas with their coating as they rise from the wax bath in the tank 84. A second blower 99 has an intake duct 100 in communication with the upper portion of the dipping chamber 84 and it has an outlet or discharge duct 101 in communication with an opening 102 and the vertical wall of the drying chamber 85.

The main blower 103 at the inlet side of the air conditioning unit 92 has a duct 104 connected by an angularly connected portion to an opening 106 in the side wall of the chamber 85. The duct 104 is provided with an automatically controlled spill and intake damper 108. This damper may be adjusted when necessary to blow out some of the used air in place of the fresh untreated air from the room in which the apparatus is located. The damper is opened, for example when the air in the drying chamber has a higher humidity than the air in the room, and is closed when the air in the room requires some conditioning in addition to that in the machine, as for example, on the extremely humid days.

The air conditioning unit 92, while shown diagrammatically, generally includes an air filter 109 in its forward end to exclude dust and dirt insofar as possible in order not to impair the efficiency of the machine. The conditioner is also provided with a dehumidifier 110 in the path of air which leaves the air filter. The dehumidifier may be of any desired construction, as for example a simple form might comprise a fin or lattice-type refrigerating coil, in order to provide good heat transfer. As the air passes through the refrigerating coil, its temperature is reduced and the moisture is condensed since the moisture retaining ability of the air is lower. A drain 111 is located beneath the refrigerating coil 110 in order to carry off the condensed moisture.

Further a moisture eliminator 112 is located in the conditioner in a position to receive the air after it has passed the cooling coil and remove any water blown off the coil. This eliminator unit may be a finned type structure desired to direct the water downwardly into the drain 111. Other methods of moisture removal may be employed, as for example a dehydrating substance such as silica gel or other chemical substances. Also if desired another type, constructed to spray cold water into the air to reduce the dew point of the air and entrain the moisture with the spray of water, could be used.

After the air has been filtered and relieved of moisture it may be heated by a heating coil 113 equipped with a heat control valve 114 and a trap 115 for condensed steam.

With the structure described, bananas or other products may be treated under controlled conditions. The product and air move in opposite directions through the tunnels and make-up air fresh or recirculated is conditioned prior to its contact with the product. Further, with the system above described, there is a balanced air flow and pressure, simplifying the structure.

In operation, air discharged from the air conditioning unit into the discharge end of the upper drying tunnel through the duct 93 meets the fruit or other product head-on throughout the length of this upper tunnel and then passes downwardly into the discharge end of the lower tunnel 86 being withdrawn through a duct 94 from the contiguous ends of both tunnels by means of the blower 95. The fruit or thing treated is placed on the hook 65 of the conveyor, bananas being usually applied to these hooks in the form of "hands" or bunches whereupon each hook with its load moves upwardly horizontally to the left and downwardly into the dipping chamber and from the dipping chamber around in the opposite direction that the air moves. The pressure and volume of air from the conditioner is adjusted so that it equals the suction at the opening 114 in the tunnel 87 and through which the "hands" of the bananas pass downwardly to the take-off station. The automatically controlled spill or intake damper 108 compensates for the loss of air at some of the open points in the system by the quantity of fresh air in the amount taken in.

The bananas are submerged, backs down, in the wax emulsion and are carried upwardly from the tank through the vertical duct 85, the excess wax being removed by the air from the nozzles 97 and 101 which expedites the drying. The bananas moving upwardly through the chamber 85 are also subject to air which has been used for drying bananas in the ducts 87 and 86. By adjusting the valve 108 the amount of air passing through the conduit 104 to the blower 103 is controlled as previously stated so that sufficient amount of air is always present as well as fresh air. In some instances it may not be necessary to use the air conditioning unit in which event the valve 108 can be adjusted accordingly. From the duct 87 the bananas move downwardly to the take-off station at the right of Fig. 1.

By reason of the location of the two blowers 99 and 95 at the wax emulsion tank and in connection with the blower 103 located at the intake end of the air conditioner, a continuous circulation is provided throughout the cooling chamber for hardening the wax emulsion on the bananas. Thus the bananas traveling through the drying tunnels or chambers are under the constant treatment of conditioned air which is automatically controlled, and from the time the bananas leave the wax emulsion tank they are moving forward through a constant counter flow of conditioned air.

The speed of the machine may be regulated as desired to provide the necessary drying period in accordance with the condition of the bananas being treated.

It will be obvious to those skilled in the art that the foregoing and other advantages not herein specifically mentioned are inherent in the apparatus and it will be understood that the disclosure is not to be construed as restrictive but merely as illustrative, the invention being limited only as set forth in the appended claims.

What is claimed is:

1. Apparatus for wax coating bananas comprising a main chamber, an endless flexible conveyor mounted for travel in said chamber, means partitioning off said chamber into a dipping chamber, a preliminary drying tunnel and a final drying tunnel, said dipping chamber being located below said preliminary drying tunnel and provided with a substantially vertically extending flue communicating with said latter tunnel, a dipping tank for containing a wax emulsion located in the lower portion of said dipping chamber, means whereby hands of bananas may be suspended from said conveyor so that they will dip into the emulsion while traveling adjacent the tank, the bananas being conveyed from the tank upwardly through said flue and thence through the preliminary and final drying tunnels, means for exhausting air from said dipping chamber and applying such air forcefully across said vertical flue and onto the bananas as they pass upwardly through said flue, and means for exhausting air from said preliminary drying tunnel and also applying such air in a forced draft across said flue and onto the bananas.

2. Apparatus for wax coating bananas comprising a main chamber, an endless flexible conveyor mounted for travel in said chamber, means partitioning off said chamber into a dipping chamber, a preliminary drying tunnel and a final drying tunnel, said dipping chamber being located below said preliminary drying tunnel and provided with a substantially vertically extending flue communicating with said latter tunnel, a dipping tank for containing a wax emulsion located in the lower portion of said dipping chamber, means whereby hands of bananas may be suspended from said conveyor so that they will dip into the emulsion while traveling adjacent to the tank, the bananas being conveyed from the tank upwardly through said flue and thence through the preliminary and final drying tunnel, a conduit arranged to exhaust air from said dipping chamber and direct such air across said vertical flue and onto the bananas as they pass upwardly through said flue, another conduit arranged to exhaust air from preliminary drying tunnel and direct such air across said flue and onto the bananas.

3. Apparatus for wax coating bananas comprising a main chamber, an endless flexible conveyor mounted for travel in said chamber, means partitioning off said chamber into a dipping chamber, a preliminary drying tunnel and a final drying tunnel, said dipping chamber being located below said preliminary drying tunnel and provided with a substantially vertically extending flue communicating with said latter tunnel, a dipping tank for containing a wax emulsion located in the lower portion of said dipping chamber, means whereby hands of bananas may be suspended from said conveyor so that they will dip into the emulsion while traveling adjacent the tank, the bananas being conveyed from the tank upwardly through said flue and thence through the preliminary and final drying tunnels, means for exhausting air from said dipping chamber and applying such air across said vertical flue onto the bananas as they pass upwardly through said flue, and means for exhausting air from said preliminary drying tunnel and also applying such air in a forced draft across said flue and onto the bananas.

4. Apparatus for wax coating bananas comprising a main chamber, an endless flexible conveyor mounted for travel in said chamber, means partitioning off said chamber into a dipping chamber, a preliminary drying tunnel and a final drying tunnel, a dipping tank for containing a wax emulsion mounted in said dipping chamber, means whereby hands of bananas may be suspended from said conveyor so that they will dip into the emulsion while traveling adjacent said tank, a conduit having its inlet end communicating with said preliminary drying tunnel and its discharge end terminating in a nozzle member arranged to apply a forced travel of air to the bananas as they move upwardly from said tank to remove excess wax therefrom, another conduit having its inlet end exhausting air from said dipping chamber and its outlet end provided with a nozzle member also arranged to apply a forced draft of air to the bananas as they move upwardly from said tank, said second-named nozzle member being arranged to act on the bananas after said first-named nozzle member.

5. Apparatus for wax coating bananas comprising a main treating and drying chamber, an endless flexible conveyor mounted for travel in said chamber, means partitioning off said chamber into a dipping chamber, a preliminary drying tunnel and a final drying tunnel, a dipping tank for containing a wax emulsion located in said dipping chamber, means whereby hands of bananas may be suspended from said conveyor so that they will dip into the emulsion while traveling adjacent said tank, a conduit having its inlet end communicating with said preliminary drying tunnel and its discharge end terminating in a nozzle member arranged to apply a forced draft of air to the bananas as they move upwardly from said tank to remove excess wax therefrom, another conduit having its inlet end exhausting air from said dipping chamber and its outlet end provided with a nozzle member, and means to apply a forced draft of air through said nozzle to the bananas as they move upwardly from said tank to remove excess wax from the bananas and expedite the drying operation, and means for forcefully circulating air through said conduits.

6. Apparatus for wax coating bananas comprising a main chamber, means partitioning off said chamber into a dipping chamber, a preliminary drying tunnel and a final drying tunnel, an endless flexible conveyor mounted for travel in said main chamber, a dipping tank for containing a wax emulsion mounted in said dipping chamber, means whereby hands of bananas may be suspended from said conveyor so that they will dip into the emulsion while traveling adjacent said tank, a nozzle member arranged to apply a forced draft of air to the bananas as they move upwardly from said tank to remove excess wax therefrom, means for withdrawing air from said dipping chamber and forcefully circulating such air through the preliminary drying tunnel, and an air conduit having its intake end communicating with the preliminary drying tunnel and its discharge end communicating with said nozzle member.

7. Apparatus for wax coating bananas comprising a main chamber, means partitioning off said chamber into a preliminary conditioning chamber, a dipping chamber, a preliminary drying tunnel and a final drying tunnel, an endless flexible conveyor mounted to travel through said conditioning and treating chambers and drying tunnels, a tank for containing a wax emulsion mounted in said dipping chamber, means whereby hands of bananas may be suspended from said conveyor so that they will dip into the emulsion while traveling adjacent said tank, means for selectively conditioning the air in the preliminary drying chamber to condition the bananas for the bath, and means for circulating conditioned air in said dipping chamber and preliminary and final drying tunnels.

8. An apparatus for wax coating stalk-ripened bananas comprising a pair of horizontally disposed drying tunnels one located above the other and extending beyond the same, an air conditioning unit, a duct extending therefrom to one end of the uppermost of said tunnels, a blower connected to said air conditioner unit, a waxing tank located below said tunnels, said blower connected to the upper end of said tank, a vertical tunnel connecting the lower of said air tunnels to said tank, an endless flexible conveyor means on said conveyor for suspending bananas therefrom, said conveyor positioned so that its travel will be down into said waxing tank and then up and through said vertical tunnel and both of said drying tunnels, a booster blower having a nozzle directed into the upper end of said waxing tank and a duct from said blower connected to one end of said lower drying tunnel.

9. An apparatus for wax coating stalk-ripened bananas comprising a pair of horizontally disposed drying tunnels one located above the other and extending beyond the same, an air conditioning unit, a duct extending therefrom to the outlet end of the uppermost of said tunnels, a blower connected to said air conditioner unit, a waxing tank located below said tunnels, an air duct connecting said blower to the upper end of said tank, a vertical tunnel connecting the lower of said air tunnels to said tank, an endless flexible conveyor, means on said conveyor for suspending bananas therefrom, said conveyor positioned so that its travel will be down through said waxing tank and then up and through said vertical tunnel and thru both of said drying tunnels, whereby bananas are carried forward into said waxing tank to be immersed in wax and then carried forward through an oppositely directed current of conditioned air to cool and dry the wax coating on the bananas.

10. An apparatus for wax coating stalk-ripened bananas comprising a pair of horizontally disposed drying tunnels one located above the other and extending beyond the same, an air conditioning unit, a duct extending therefrom to the outlet end of the uppermost of said tunnels, a blower connected to said air conditioner unit, a waxing tank located below said tunnels, an air duct connecting said blower to the upper end of said tank, an automatically operated air valve in said air duct, a vertical tunnel connecting the lower of said air tunnels to said tank, an endless flexible conveyor, means on said conveyor for suspending bananas therefrom, said conveyor positioned so that its travel will be down through said waxing tank and then up and through said vertical tunnel and through both of said drying tunnels, whereby bananas are carried forward into said waxing tank to be immersed in wax and then carried forward through an oppositely directed current of conditioned air to cool and dry the wax coating on the bananas.

11. An apparatus for wax coating stalk-ripened bananas comprising a pair of horizontally disposed drying tunnels one located above the other and extending beyond the same, an air conditioning unit, a duct extending therefrom to one end of the uppermost of said tunnels, a blower connected to said air conditioner unit, a waxing tank located below said tunnels, an air duct connecting said blower to the upper end of said tank, an air valve in said duct, a vertical tunnel connecting the lower of said air tunnels to said tank, a booster blower mounted on said tank connected to the top thereof and having a nozzle connected to said vertical tunnel, an endless flexible conveyor, means on said conveyor for suspending bananas therefrom, said conveyor positioned so that its travel will be through said waxing tank and up through said vertical tunnel and then through both of said drying tunnels, a second booster blower having a nozzle directed into the upper end of said waxing tank and a duct from said blower connected to one end of said lower drying tunnel.

12. An apparatus for wax coating stalk-ripened bananas comprising a pair of horizontally disposed drying tunnels one located above the other and extending beyond the same, an air conditioning unit, a duct extending therefrom to one end of the uppermost of said tunnels, a blower connected to said air conditioner unit, a waxing tank located below said tunnels, said blower connected to the upper end of said tank, a vertical tunnel connecting the lower of said air tunnels to said tank, an endless flexible conveyor, means on said conveyor for suspending bananas therefrom, said conveyor positioned so that its travel will be through said waxing tank and through both of said drying tunnels, said blower providing a steady stream of air opposing the movement of bananas through the apparatus and said air conditioning unit adapted to control the temperature and humidity of the air being used.

13. A device of the character described comprising a coating chamber, a drying chamber, means for conveying articles coated from the coating chamber into the drying chamber, an air conditioning system, conduits connecting said coating chamber and said drying chamber with said air conditioning system, means for withdrawing air from the coating chamber passing it through the air conditioning system and returning it through the drying chamber to the coating chamber counter to the conveying means, and means for discharging a portion of the air circulated and tor admitting outside air for replacement.

14. A device of the character described comprising a coating chamber, a drying chamber, means for conveying articles coated from the coating chamber into the drying chamber, an air conditioning system, conduits connecting the coating chamber and the drying chamber with said air conditioning system, means for withdrawing air from the coating chamber passing it through the air conditioning system and returning it through the drying chamber to the coating chamber counter to the conveying means, and means for discharging a portion of the air circulated.

15. A device of the character described comprising a coating chamber, a drying chamber, means for conveying articles coated from the coating chamber into the drying chamber, an air conditioning system, pneumatic conduits connecting the coating chamber and the drying chamber with said air conditioning system, means for withdrawing air from the coating chamber passing it through the air conditioning system and returning it through the drying chamber to the coating chamber.

16. Apparatus for coating and drying articles comprising a coating chamber, a drying chamber, a conveyor for conveying articles from the coating chamber to the drying chamber, means for circulating air in a closed circuit through said chambers, and a conditioner for controlling the temperature and humidity of the circulated air, said means for circulating including means for withdrawing the air from the coating chamber passing it through the conditioner and returning it through the drying chamber to the coating chamber.

17. Apparatus for coating and drying articles comprising a coating chamber, a drying chamber, a conveyor for conveying articles from the coating chamber to the drying chamber, means for circulating air in a closed circuit through said chambers, and a conditioner for controlling the temperature and humidity of the circulated air, said means for circulating including means for withdrawing the air from the coating chamber passing it through the conditioner and returning it through the drying chamber to the coating chamber, and auxiliary means for withdrawing air from the coating chamber and discharging it across the path of movement of the coated articles as they pass from said coating chamber.

18. A device of the character described, comprising, a coating chamber, a drying chamber, means for conveying articles coated from the coating chamber into the drying chamber, an air conditioning system, pneumatic conduits connecting the coating chamber and the drying chamber with said air conditioning system, means for withdrawing air from the coating chamber, passing it through the air conditioning system and returning it through the drying chamber to the coating chamber, and adjustable valve means for controlling the spilling of air from the system of air which is circulating in said device and the leakage of outside air into said system.

ROBERT O. HOCKMAN.
WALTER C. REIMAN.

REFERENCES CITED

The following references are of record in the file of this patent:

UNITED STATES PATENTS

| Number | Name | Date |
| --- | --- | --- |
| 1,785,835 | Lanzi | Dec. 23, 1930 |
| 1,651,871 | Collins | Dec. 6, 1927 |
| 1,790,501 | Fox | Jan. 27, 1931 |
| 2,177,323 | Kirkendall | Oct. 24, 1939 |
| 1,715,392 | Schutte | June 4, 1929 |
| 2,233,069 | Atwell | Feb. 25, 1941 |
| 2,269,592 | McGraw | Jan. 13, 1942 |
| 1,334,840 | Collins | Mar. 23, 1920 |
| 2,361,350 | Keep et al. | Oct. 24, 1944 |